Dec. 14, 1926. J. W. HOOLEY Re. 16,503

FUSE

Original Filed Oct. 30, 1925

John W. Hooley INVENTOR
BY
O. Alvey Edwards
ATTORNEY

Reissued Dec. 14, 1926.

Re. 16,503

UNITED STATES PATENT OFFICE.

JOHN W. HOOLEY, OF LARCHMONT, NEW YORK.

FUSE.

Original No. 1,585,859, dated May 25, 1926, Serial No. 65,748, filed October 30, 1925. Application for reissue filed September 11, 1926. Serial No. 134,923.

The object of my invention is to provide a fuse for electrical circuits, which fuse may be inserted between terminals of such a circuit in any desired way and used in the conventional manner and which will indicate on its face its current capacity in clear and unmistakable terms. This object is accomplished by my invention, one embodiment of which is hereinafter more particularly set forth.

For a more detailed description of my invention, reference is to be had to the accompanying drawings forming a part hereof, in which—

Figure 1:
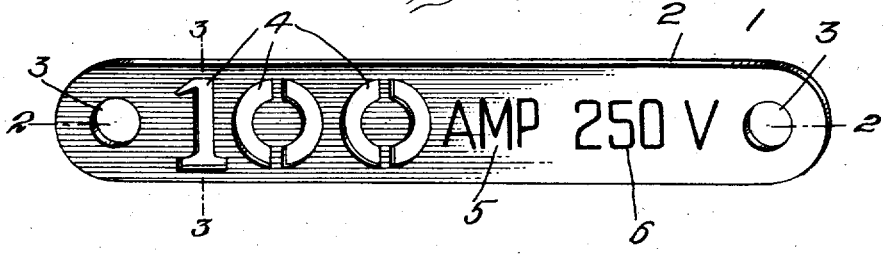

Figure 1 is a perspective view of a fuse embodying my invention.

Figure 2:
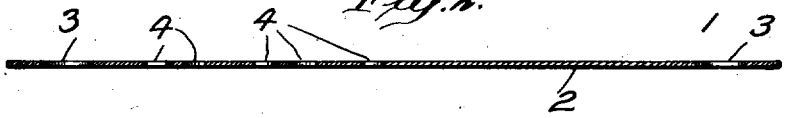
Figure 3:
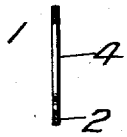

Figures 2 and 3 are sectional views, taken on the lines 2—2 and 3—3, respectively, of Figure 1.

Throughout the various views of the drawings, similar reference characters designate similar parts.

My improved fuse 1 is composed of a sheet or strip 2 of fusible metal with perforations 3, one at each end, by means of which it may be held in position when in use. This fuse has, at suitable intervals, numerals formed therein by suitable means such as by cutting them in a manner similar to the making of stencils. Said numerals are for the purpose of indicating the capacity of the fuse. In the embodiment illustrated, the characters "100" are shown at 4, and, of course, any other numerals may be used which may be suitable, as is obvious. The numerals comprising the group illustrated at 4 indicate the capacity of the fuse in amperes, being followed by the letters illustrated at 5 which indicate amperes, and the legend illustrated at 6 means 250 volts.

The capacity of the fuse is determined by the cross section of the metal at each end of the openings which are in the form of numeral characters, and this section is made so that the fuse will carry what is indicated by said characters.

From the foregoing, it is apparent that my improved fuse is one that can be read in all lights so that it is convenient for dark places and any one of a number of fuses may be readily picked out, according to what is required.

By reference to the fuses being convenient for dark places I mean that when a new fuse is to be selected for use, and there is insufficient light to enable the numeral characters which indicate the capacity of the fuse to be clearly visible, said characters can be felt by one's fingers and their meaning determined. Such finger reading is facilitated by the fact that the characters are formed by openings so that they can be felt from both sides of the fuse strip.

While I have shown and described one embodiment of my invention, it is obvious that it is not restricted thereto, but that it is broad enough to cover a structure that comes within the scope of the annexed claims.

What I claim is:

1. A sheet of fusible and conducting material having characters cut out of the same whereby the capacity of the fuse is reduced to what is indicated by the characters.

2. A fuse strip having openings therein in the form of characters determining and indicating the capacity of the fuse.

3. A fuse strip having numerals indicating and determining its current-carrying capacity, said numerals having a size and being so formed in the strip as to enable their meaning to be determined by the sense of feeling.

4. A fuse strip having a plurality of openings therein in the form of characters indicating the current-carrying capacity of the fuse.

5. A fuse strip having its current-carrying capacity indicated by a plurality of characters the shape of which can be determined from either side of the strip.

JOHN W. HOOLEY.